United States Patent [19]
Watson

[11] 3,875,807
[45] Apr. 8, 1975

[54] POWER TRANSLATING DEVICE: ORBIT ENGINE

[76] Inventor: Harold E. Watson, 6919 Clayton Ave., Dallas, Tex. 75214

[22] Filed: Oct. 9, 1970

[21] Appl. No.: 79,464

[52] U.S. Cl. .................................................. 74/25
[51] Int. Cl. ............................................ F16h 21/16
[58] Field of Search ..................................... 74/25

[56] References Cited
UNITED STATES PATENTS
| | | | |
|---|---|---|---|
| 2,996,928 | 8/1961 | Watson | 74/25 |
| 3,258,979 | 7/1966 | Alsept | 74/25 |
| 3,403,668 | 10/1968 | Schottler | 74/25 |

Primary Examiner—Wesley S. Ratliff, Jr.

[57] ABSTRACT

In the past various and sundry mechanical movements have been utilized for the purpose of translating motion from one form to another, for example; gears, pulleys and pistons, etc. This invention relates to a new mechanical movement for the translation of motion. This movement translates a reciprocating linear movement into a rotary movement. This translation is achieved by the use of a cam drive ring in combination with a centrifugal tortion drive cam. The applications for this mechanical movement are varied in that the orbit engine can be adapted to many uses and many external power sources.

4 Claims, 7 Drawing Figures

INVENTOR
Harold E. Watson
BY *Harold E. Watson*

POWER TRANSLATING DEVICE: ORBIT ENGINE

This invention relates to a new mechanical movement and particularly to the translation of linear reciprocating motion into rotary motion.

More particularly, the invention relates to the translation of motion from an outside source which is applied diametrically to the circumference of a cam drive ring, the external motion being in the form of a reciprocating linear motion. When the external power source imparts a linear motion which acts upon the cam drive ring, the cam drive ring is displaced laterally to a small extent, this lateral motion of the cam drive ring is transmitted to the centrifugal tortion drive cam which rotates within the cam drive ring. The movement of the centrifugal tortion drive cam is transmitted to the drive rod which is affixed moveably to the drive shaft. The movement of the drive rod which, like the centrifugal tortion drive cam, is rotary, imparts a rotary motion to the drive shaft. The drive shaft is capable of being attached to some form of power take-off device so that the translated motion can be put to useful work.

In the example shown, the slot in the drive shaft is oval, but this is not to be construed as a limitation of the scope of the invention, because the slot in the drive shaft can be of any shape desired so long as it permits the drive rod to movoe reciprocally within the drive shaft.

In the past, linear reciprocating motion has been translated into rotary motion by many means, but never, as far as is known by this inventor, by means of a cam drive ring in conjunction with a centrifugal tortion drive cam and a drive rod mounted in a drive shaft so as to allow reciprocal movement of the drive rod within its mounting with the drive shaft.

It is an object of this invention to provide a new and improved method of translating motion so as to provide power where it is necessary and desired.

It is another object of this invention to provide a new and improved method of translating motion into useful power by a method which is best typified by its simplicity.

The novel features which are believed to be characteristic of the invention are set forth with particularity in the appended claims. The invention itself, however, both as to its organization and method of operation together with further objects and advantages thereof may best be understood by reference to the following description taken in connection with the accompanying drawings, in which:

Figure 1:
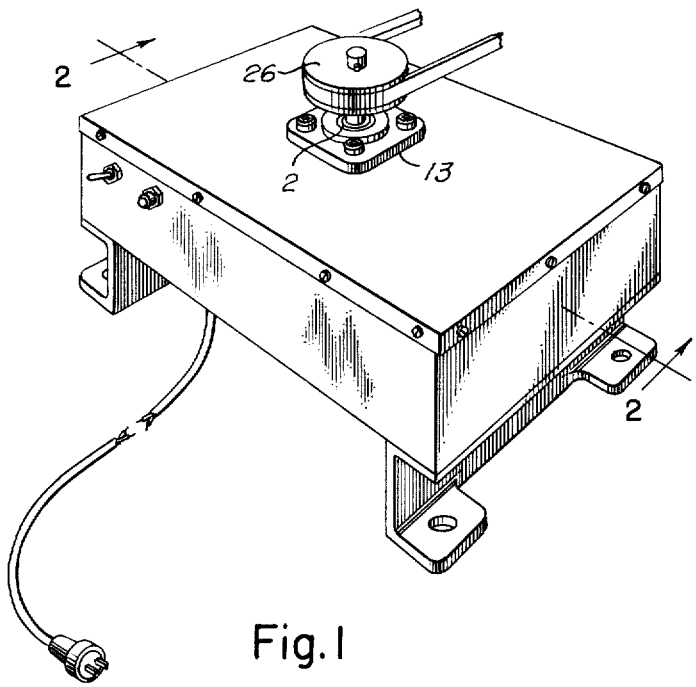
FIG. 1 is an isometric view of the power translating device.
Figure 4:
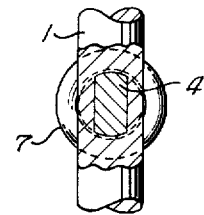
FIG. 4 shows a cross-section of the output shaft taken along lines 4—4 of FIG. 2.

The purpose of the drawing is to exemplify one of the preferred embodiments of this device. Referring now in detail to the drawing, it depicts as stated one of the preferred embodiments of the device for translating motion into power - this translation is accomplished as follows:

The Drive Shaft (1) is mounted through ball bearings (2)-(3) contained in bushings (13). It has a milled oval slot through its center (4) and is fitted with an eliptical timing sleeve cam (5). Through the slot (4) a drive rod (6) is installed. The drive rod (6) is threaded oval shaped at one extremity, (see FIG. 4), with cylindrical stepped portions to receive centering springs (7)-(8). The Drive rod is retained by a spring washer (9) and a lock nut (10). The other extremity of the drive rod (6) is yoke shaped. Through this yoke is installed a shaft (12), and mounted through ball bearings (14)-(15). A spherical, (or other suitable shaped), centrifugal tortion drime cam (16) is fitted, with the shaft (12) and with bearings (14)-(15) through its center.

Figure 5:
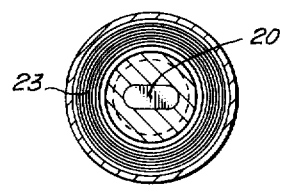
FIG. 5 shows a cross-section of the drive means taken along lines 5—5 of FIG. 2.
Figure 2:
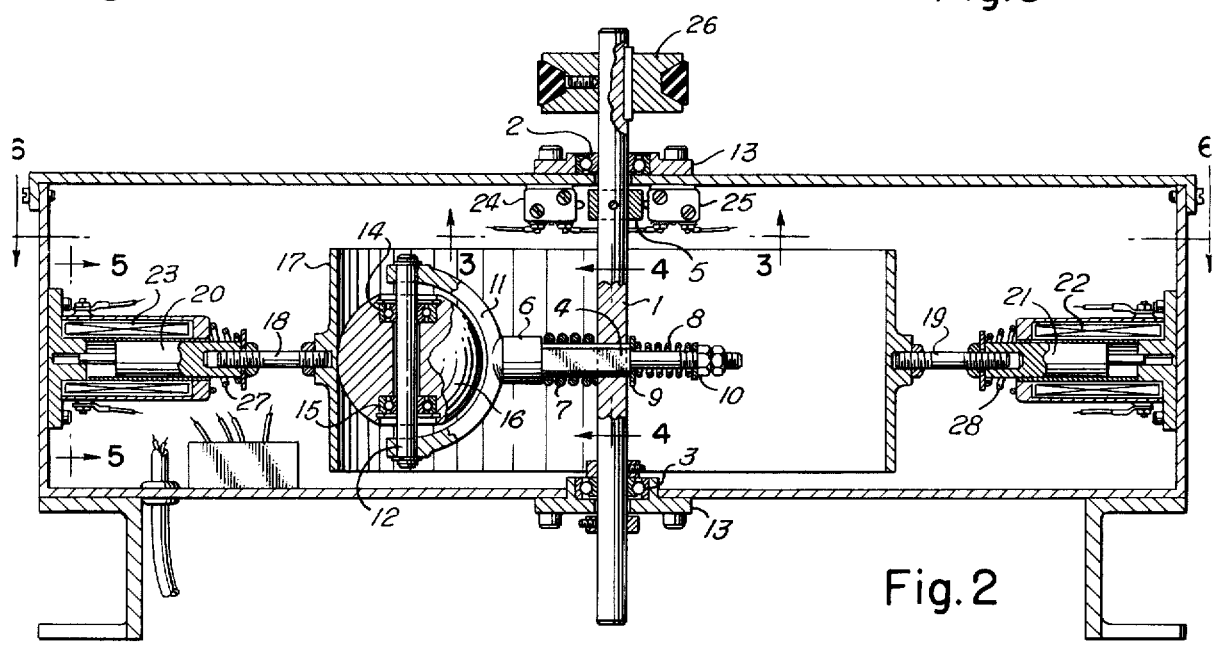
FIG. 2 shows an elevation taken along lines 2—2 of FIG. 1.

Around this drive cam (16) is centered a cam drive ring (17) which has diametrically extending threaded drive rods (18)-(19). To the extremities of these drive rods is affixed a pair of solenoid cores (20)-(21). These cores have an oval guide stem at their rear portion, (see FIG. 5), which when mounted into the solenoids (22)-(23), prevents the cam drive ring (17) from yawing. The frontal portion of the cores (20)-(21) are female threaded to receive drive rods (18)-(19) and the cores are installed through return springs (27)-(28) into the solenoids.

Figure 3:
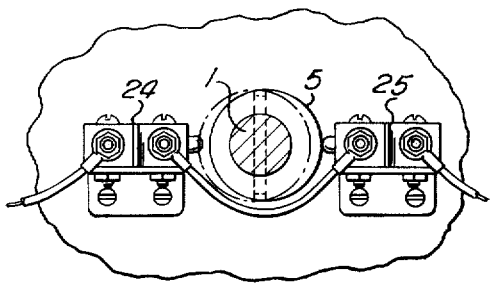
FIG. 3 shows details of the output shaft and switch taken along lines 3—3 of FIG. 2.
Figure 7:
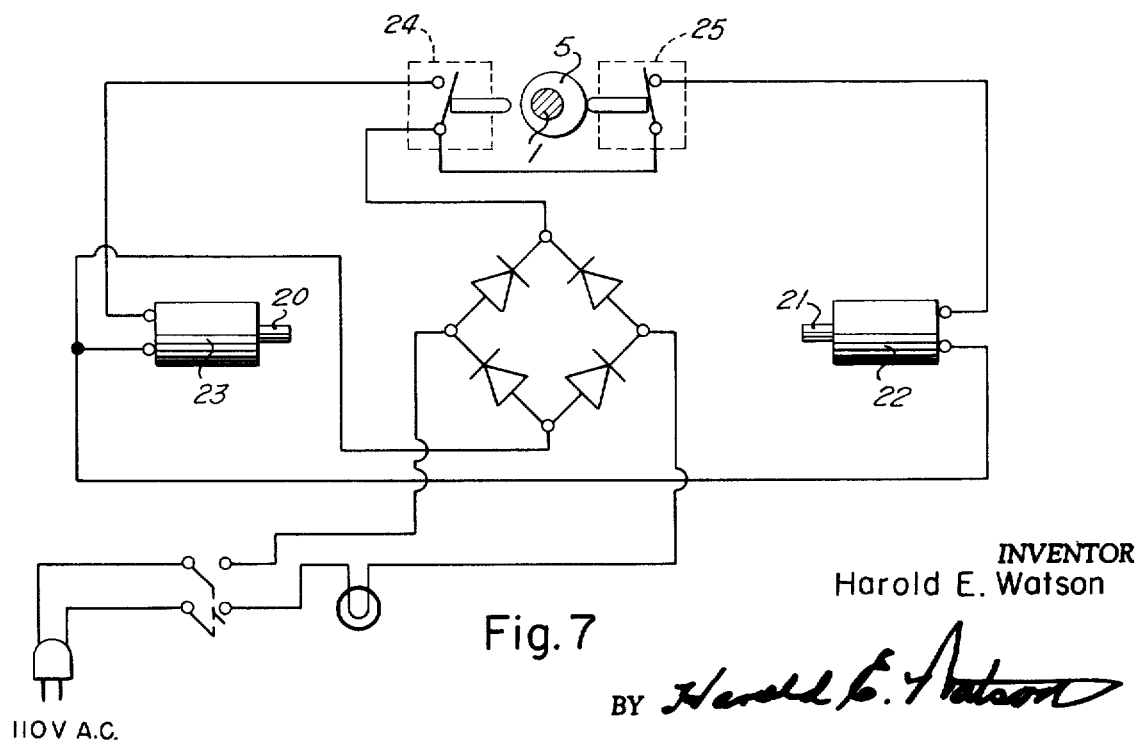
FIG. 7 shows the electric circuit of the power translating device.

The electrical circuit as shown in the drawing (see FIG. 7) when closed will transmit the desired current to the micro-switches (24)-(25) (see FIG. 3) controlled by the timing cam (5), (or other suitable timing devices). The micro-switches will direct the current flow to impulse the proper solenoid at the proper time activating it for directing a mechanical power thrust in the desired direction. When the power thrust is applied to the cam drive ring (17) a motive force is applied to the centrifugal tortion drive cam (16) thus rotating the drive shaft (1) from which a power take off pulley (26) is provided. Operational direction may be optional, with proper timing devices the orbit engine may be rotated in either direction, after stopping its directional travel.

Figure 6:
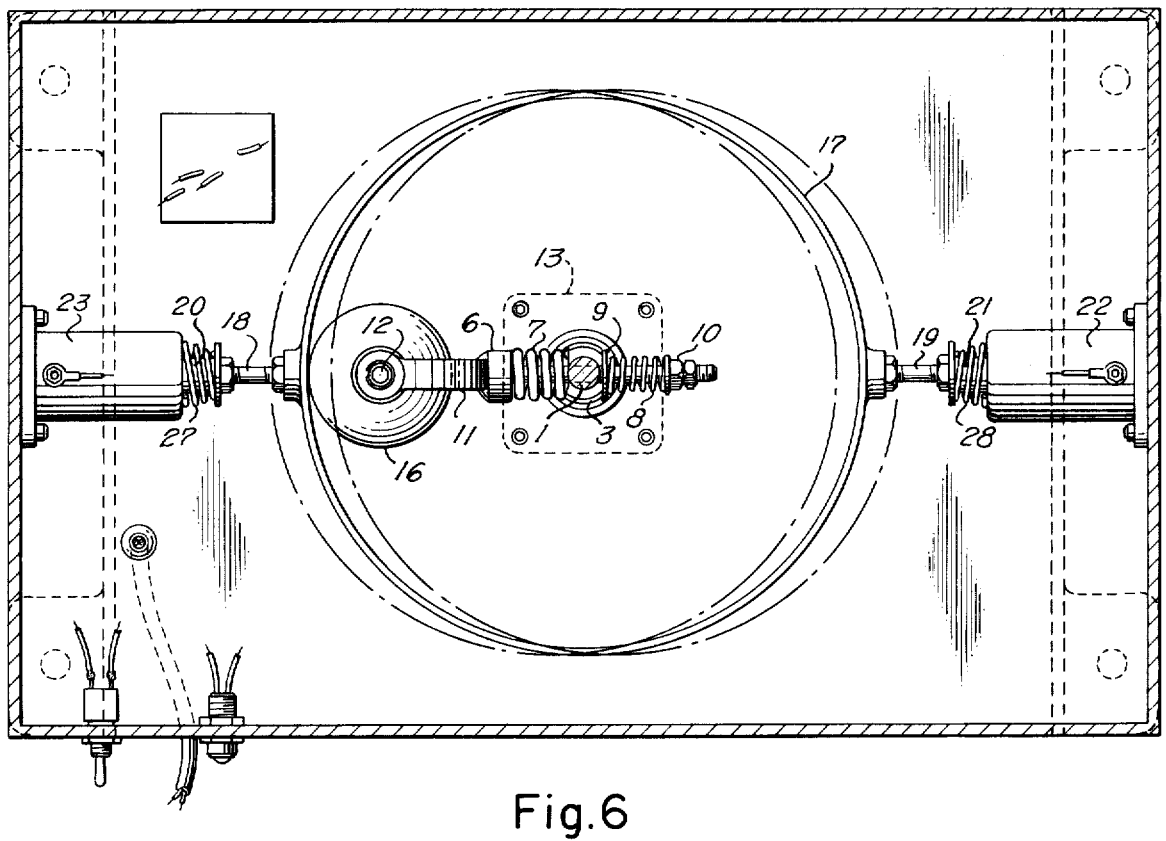
FIG. 6 shows details of the cam and universal coupling taken along lines 6—6 of FIG. 2.

It can be noted that because of the centering springs (7)-(8) and the slidable drive rod (6) through the shaft slot (4), an elliptical rotational plane of orbital travel is permitted, resulting from centrifugal force of the centrifugal tortion drive cam (16). (See overhead view, FIG. 6). The power stroke may lengthen, thus increasing the power output potential. However, the cam is retained in orbital position by the latitude of the cam ring drive (17).

What I claim as new and desire to secure by Letters Patent of the United States is as follows:

1. A power transmitting device comprising an output shaft mounted in bearings and a controllable reciprocating activating timing device; said output shaft having a milled oval-shaped slot through which one end of a drive shaft fitted with centering springs extends; the other end of said drive shaft having a universal coupling means fitted with a yoke and a spherical member in driving engagement with an input member.

2. A power translating device, according to claim 1, wherein said input means includes a cam drive ring mounted in frictional engagement with said universal coupling means.

3. A power translating device, according to claim 1, wherein said input means further includes a reciprocating power means operatively connected to said universal coupling means.

4. A power translating device, according to claim 1, wherein said input means further includes an electric circuit, whereby, upon energization of said power means said drive ring imparts torque to said universal coupling means to produce rotation at said output shaft.

* * * * *